US012234557B2

(12) United States Patent
Camilleri et al.

(10) Patent No.: US 12,234,557 B2
(45) Date of Patent: Feb. 25, 2025

(54) METHOD OF FORMING 3D OBJECTS

(71) Applicant: EFFUSIONTECH Pty Ltd, Bayview (AU)

(72) Inventors: Steven Camilleri, Bayview (AU); Byron Kennedy, Bonbeach (AU); Toby Jarret, Darwin (AU); Lyell Embery, Stuart Park (AU); Sylvain Laversanne, Coburg (AU)

( * ) Notice: Subject to any disclaimer, the term of this patent is extended or adjusted under 35 U.S.C. 154(b) by 0 days.

(21) Appl. No.: 16/340,737

(22) PCT Filed: Oct. 5, 2017

(86) PCT No.: PCT/AU2017/051083
§ 371 (c)(1),
(2) Date: Apr. 10, 2019

(87) PCT Pub. No.: WO2018/068082
PCT Pub. Date: Apr. 19, 2018

(65) Prior Publication Data
US 2019/0316262 A1    Oct. 17, 2019

(30) Foreign Application Priority Data
Oct. 11, 2016    (AU) ............................... 2016904106

(51) Int. Cl.
| | | |
|---|---|---|
| C23C 24/04 | (2006.01) | |
| B22F 10/25 | (2021.01) | |
| B22F 10/30 | (2021.01) | |
| B22F 10/38 | (2021.01) | |
| B22F 10/85 | (2021.01) | |
| B22F 12/53 | (2021.01) | |
| B33Y 10/00 | (2015.01) | |
| B33Y 30/00 | (2015.01) | |
| B33Y 50/02 | (2015.01) | |

(52) U.S. Cl.
CPC .............. *C23C 24/04* (2013.01); *B22F 10/25* (2021.01); *B22F 10/30* (2021.01); *B22F 10/38* (2021.01); *B22F 10/85* (2021.01); *B22F 12/53* (2021.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 5,316,800 A * | 5/1994 | Noakes | B05B 12/04 |
| | | | 427/256 |
| 6,296,043 B1 * | 10/2001 | Bowen | C23C 4/123 |
| | | | 164/155.3 |
| 6,492,651 B2 | 12/2002 | Kerekes | |
| 2004/0222310 A1 * | 11/2004 | Donatti | B29C 41/52 |
| | | | 239/11 |
| 2007/0158200 A1 * | 7/2007 | Cohen | C25D 5/00 |
| | | | 427/457 |
| 2010/0170937 A1 * | 7/2010 | Calla | C23C 24/04 |
| | | | 156/60 |
| 2013/0193619 A1 * | 8/2013 | Church | B29C 64/165 |
| | | | 264/109 |
| 2015/0056465 A1 * | 2/2015 | Zahiri | B22F 3/02 |
| | | | 427/180 |
| 2016/0107231 A1 * | 4/2016 | Doye | C23C 24/04 |
| | | | 425/78 |
| 2016/0167300 A1 * | 6/2016 | Davies | B29C 64/112 |
| | | | 428/336 |
| 2016/0236416 A1 * | 8/2016 | Bheda | B33Y 50/02 |
| 2016/0320771 A1 * | 11/2016 | Huang | B29C 67/00 |
| 2016/0325498 A1 * | 11/2016 | Gelbart | B29C 64/106 |
| 2017/0113409 A1 * | 4/2017 | Patrov | B33Y 50/02 |
| 2017/0165917 A1 * | 6/2017 | McKiel, Jr. | B29C 64/393 |
| 2017/0287685 A1 * | 10/2017 | Ferrasse | H01J 37/3426 |
| 2018/0050391 A1 * | 2/2018 | Maev | B33Y 10/00 |

FOREIGN PATENT DOCUMENTS

| | | |
|---|---|---|
| CN | 104985813 B | 3/2017 |
| JP | 2013142176 A | 7/2013 |
| WO | 2015/020939 A1 | 2/2015 |
| WO | 2015/026849 A1 | 5/2015 |
| WO | 2015157816 A1 | 10/2015 |
| WO | 2015/194678 A1 | 12/2015 |

(Continued)

OTHER PUBLICATIONS

Pattison, J., et al. "Cold Gas Dynamic Manufacturing: A Non-Thermal Approach to Freeform Fabrication." International Journal of Machine Tools and Manufacture, vol. 47, No. 3-4, 2007, pp. 627-634 (Year: 2007).*
Assadi, H., et al. "On Parameter Selection in Cold Spraying." Journal of Thermal Spray Technology, vol. 20, No. 6, 2011, pp. 1161-1176 (Year: 2011).*
Li, Chang-Jiu, et al. "A Theoretical Model for Prediction of Deposition Efficiency in Cold Spraying." Thin Solid Films, vol. 489, No. 1-2, 2005, pp. 79-85 (Year: 2005).*
Özdemir, Ozan Çağatay, Joseph Mitchell Conahan, and Sinan Müftü. 2020. "Particle Velocimetry, CFD, and the Role of Particle Sphericity in Cold Spray" Coatings 10, No. 12: 1254 (Year: 2020).*
Ozdemir, O.C., Muftu, S. Novel Method of Predicting Deposition Efficiency in Cold Spray by Incorporating Sphericity into a 1D Analytical Model. J Therm Spray Tech 32, 657-672 (2023) (Year: 2023).*

(Continued)

*Primary Examiner* — Ricardo D Morales
(74) *Attorney, Agent, or Firm* — WELSH FLAXMAN & GITLER LLC

(57) ABSTRACT

A method for forming a 3D object, comprising running control means with reference to data which defines 3D shape parameters of an object such that the control means: •uses the data to control an applicator to spray material at a substrate to build the object out of progressively applied layers, wherein at least some of the layers have an initial inwardly tapered outer edge; and •for at least some such layers causing the control means to use the data to move the applicator to apply spray material to fill in the taper.

3 Claims, 4 Drawing Sheets

(56) References Cited

FOREIGN PATENT DOCUMENTS

WO      2015189600 A2    12/2015
WO      2016039399 A1    3/2016

OTHER PUBLICATIONS

Ozdemir, O.C., Widener, C.A., Carter, M.J. et al. Predicting the Effects of Powder Feeding Rates on Particle Impact Conditions and Cold Spray Deposited Coatings. J Therm Spray Tech 26, 1598-1615 (2017). (Year: 2017).*
Ozdemir, O.C., Schwartz, P., Muftu, S. et al. High Rate Deposition in Cold Spray. J Therm Spray Tech 30, 344-357 (2021). (Year: 2021).*
Translation of Chinese Office Action dated Jul. 8, 2021—CN 201780063158.5.
Translation of Brazilian Office Action dated Oct. 5, 2021—BR 112019007190.
Translation of Turkish Office Action dated Mar. 6, 2021—TR 201905405.
Australian Statement of Grounds and Particulars dated Nov. 13, 2023—AU 2017342702.
Australian Examination Report No. 1 dated Apr. 28, 2022—AU 2017342702.
Australian Examination Report No. 2 dated Dec. 14, 2022—AU 2017342702.
Australian Examination Report No. 3 dated Mar. 15, 2023—AU 2017342702.
Korean Office Action dated Apr. 16, 2021—KR 1020197011562.
Korean Office Action dated Nov. 22, 2022—KR 1020227018342.
Chinese Office Action dated Jan. 4, 2021—CN 201780063158.5.
Chinese Office Action dated Jul. 8, 2021—CN 201780063158.5.
Japanese Written Opinion dated Mar. 3, 2022—English translation—JP 2019518914.
Japanese Notice of Reasons for Refusal dated Sep. 10, 2021—English translation—JP 2019518914.
Brazilian Office Action dated Oct. 5, 2021—BR 112019007190.
Indian Examination Report dated Mar. 15, 2021—IN 201917018569.
Turkish Office Action dated Mar. 6, 2021—TR 201905405.
Australian Evidence in Support—Hussain declaration dated Feb. 10, 2024.
J Pattison, "Cold Gas Dynamic Manufacturing", Ph.D. thesis, Darwin College, University of Cambridge, Cambridge (UK), 2006.
Fasching, M.M., et al. "Planning robotic trajectories for thermal spray shape deposition", Journal of Thermal Spray Technology 2, 45-57 (1993).
R. Gadow, M. Floristan, "11—Manufacturing engineering in thermal spraying by advanced robot systems and process kinematics", Future Development of Thermal Spray Coatings, Woodhead Publishing, 2015, pp. 259-280.
D. Hegels and H. Müller, "Evolutionary path generation for reduction of thermal variations in thermal spray coating", Proceedings of the 15th annual conference on Genetic and evolutionary computation (GECCO '13).
G. Tapia and A. Elwany, "A Review on Process Monitoring and Control in Metal-Based Additive Manufacturing", Journal of Manufacturing Science and Engineering, 136 (6), 2014.
Chang-Jiu Li, Wen-Ya Li, "Deposition characteristics of titanium coating in cold spraying", Surface and Coatings Technology, vol. 167, Issues 2-3, 2003, pp. 278-283.

* cited by examiner

METHOD OF FORMING 3D OBJECTS

FIELD OF INVENTION

This invention relates to a method for forming 3D objects from a spray material.

BACKGROUND

It is known to produce 3D objects by cold spraying metallic powder from a nozzle onto a substrate in the manner of a 3D print. This is for example for example outlined in J Pattison et al, *International Journal of Machine Tools and Manufacture*, Volume 47, Issues 3-4, March 2007, Pages 627-63. With many known techniques the spray material deposits in a generally conical pattern. It results in the sides of the eventual 3D object having an undesired taper. This makes it less than feasible, for example, to spray an object in layers because the taper effect leaves each subsequent layer with less area than the one before. In other words the taper is carried from layer to layer. It is an object of preferred embodiments of the invention to go at least some way towards addressing this. While this applies to preferred embodiments it should be understood that the object of the invention per se is simply to provide a useful choice. Therefore any advantages or limitations applicable to preferred embodiments should not be read as a limitation on the scope of any claims expressed more broadly.

The term "comprising" when used in this document in relation to a combination of features or steps should not be taken to rule out the option of there being additional features or steps. The term should not be interpreted in a limiting way.

SUMMARY OF INVENTION

According to one aspect, the invention relates to a method for forming a 3D object, comprising running control means with reference to data which defines 3D shape parameters of an object such that the control means:
uses the data to control an applicator and/or substrate holder so that spray material is sprayed at the substrate, and then at the object when part-formed, to build the object out of progressively applied layers, wherein at least some of the layers have an initial inwardly tapered outer surface; and
for at least some such layers causing the control means to use the data to cause the applicator to apply spray material to fill in the taper.

Optionally the spray is a cold spray and may comprise metallic powder.

Optionally filling in the taper involves the control means:
calculating the parameters of the taper based on characteristics of the spray;
calculating an angle between the applicator and taper appropriate for filling the taper; and
causing the applicator and taper to be at the angle and the applicator to apply spray material to the taper.

Optionally the data defines the 3D object in terms of a series of the layers (eg notional slices) and the control means uses pre-defined parameters for the next layer to control the angle between the applicator and taper for spray-filling the taper.

Optionally a surface scanner repeatedly measures the object as it is being built and the control means uses the measurements to adjust the relative positions of the object (when part formed) and the applicator, and/or spray parameters for the nozzle, to enhance accuracy of match between the shape parameters and the object when completed.

A method for forming a 3D object, comprising running a computerised controller with reference to data which defines 3D shape parameters of an object in terms of notional slices such that the controller:
uses the data to control an applicator to spray material comprising metallic powder at a substrate in adjacent lines to build the object out of progressively applied layers corresponding to the slices, wherein at least some of the layers have an initial inwardly tapered outer surface; and
for at least some such layers causing the controller to use the data to cause the applicator to spray perpendicular to the taper to fill in the taper.

Optionally the material sprayed for each line interleaves with material sprayed for one or more neighbouring lines.

Optionally a surface scanner repeatedly measures the object as it is being built, and the controller uses the measurements to adjust applicator and/or substrate and/or spray parameters to enhance accuracy of match between the shape parameters and the object when completed.

DRAWINGS

Some preferred embodiments of the invention will now be described by way of example and with reference to the accompanying drawings, of which:

DETAILED DESCRIPTION

Figure 1:
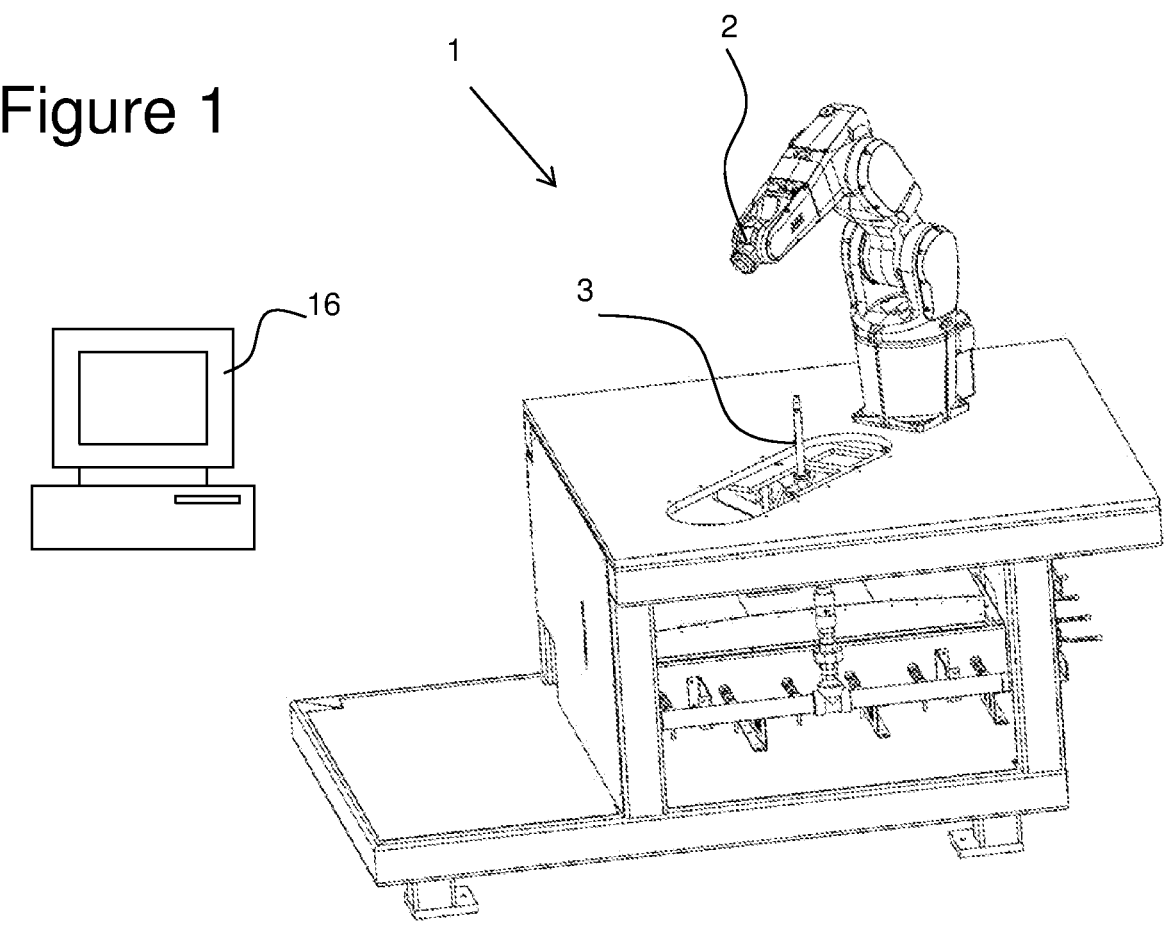
FIG. 1 is an isometric view of a 3D cold spray printer.

Referring to FIG. 1, a cold spray 3D printer 1 has an applicator comprising a nozzle 2 for dispensing a spray of suitable metallic powder at high velocity. There are many powders known for cold spraying and those skilled in the art will be familiar with these. The metallic powder is sprayed at a substrate (not shown) held by substrate holder comprising a robotic arm 3 to create a 3D object. More specifically, the object is formed from a series of parallel layers sprayed one after the other.

The robotic arm 3 is preferably such that it can move the substrate and therefore the part-formed 3D object in any direction and to any angle. The nozzle 2 is stationary in the FIG. 1 embodiment, but in other embodiments in may be moveable to spray in any direction or at any angle.

Figure 2:
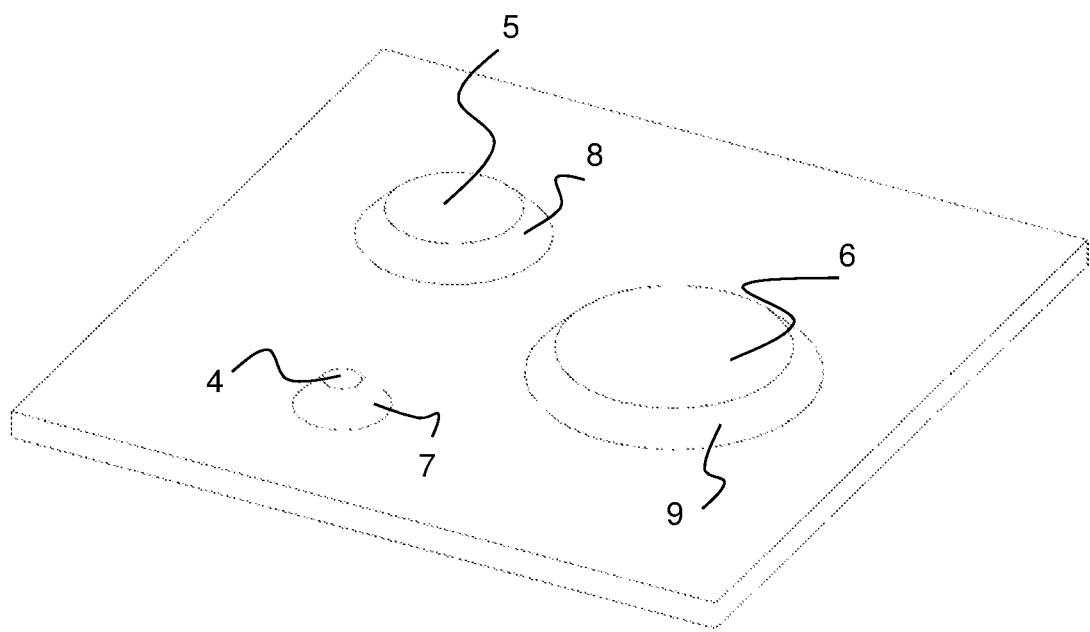
FIG. 2 is an isometric view of a first layer of each of three 3D objects partially formed by the printer.
Figure 3:
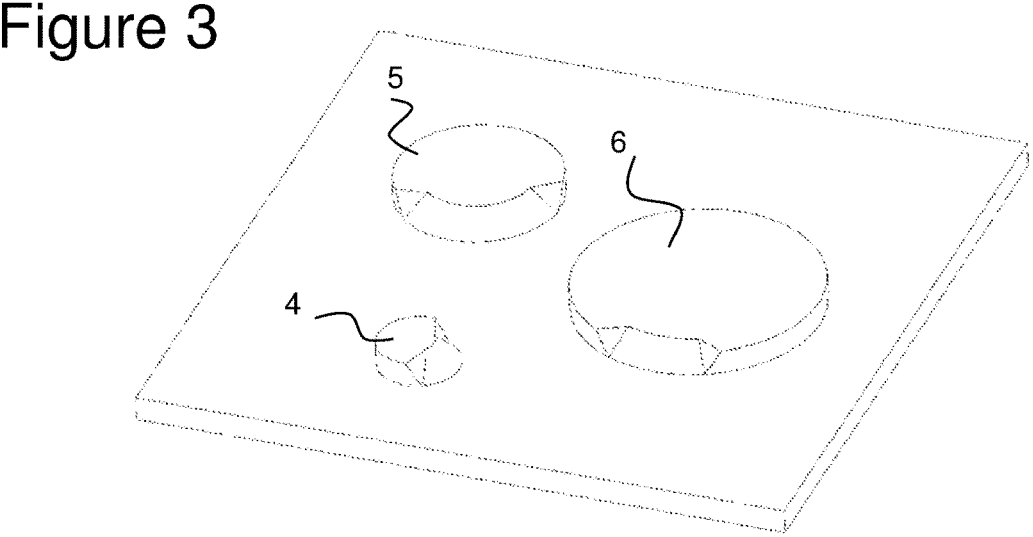
FIG. 3 is an isometric view of the partially formed objects at a more advanced stage.

FIG. 2 shows the first layer 4, 5 and 6 of three partially formed 3D objects on a plate-like substrate. Because the spray particles travel from the nozzle 2 in a conical shape they are more concentrated and move faster at the centre than at the periphery. As a consequence the deposition of powder is not uniform. This causes the layers 4, 5 and 6 to have inwardly tapered edges 7, 8, 9. The tapers are less than desirable if for example one wishes to make an object with straight edges, such as a cylinder, or some other profile. The tapers are filled in by appropriately controlling the nozzle 2 and/or the arm 3 so that the substrate and the part-formed 3D object thereon are at the correct angle and distance with respect to the nozzle. FIG. 3 shows the three layers 4, 5 and 6 with their tapers partially filled-in with spray material.

Figure 4:
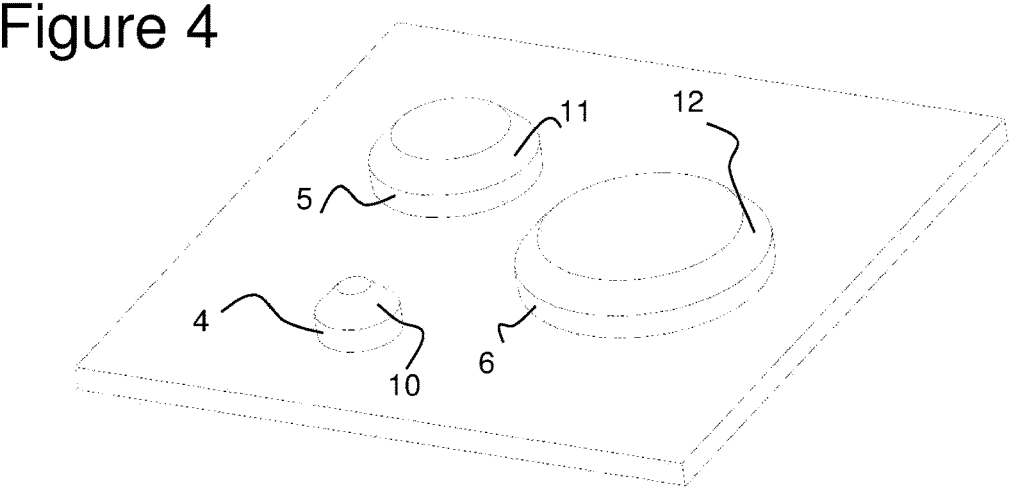
FIG. 4 is an isometric view of the three objects partially formed, with two layers almost complete.

FIG. 4 shows the first layers 4, 5 and 6 with their tapers completely filled plus a stacked upper second layer 10, 11 and 12 that has also been spray formed by the nozzle 2. In each case the second layer is parallel to the first and has a tapered edge that has yet to be filled in. The tapers are then filled the same way as for the first layers. The process is repeated for subsequent parallel layers until a 3D cylinder is formed in each case.

Figure 5:
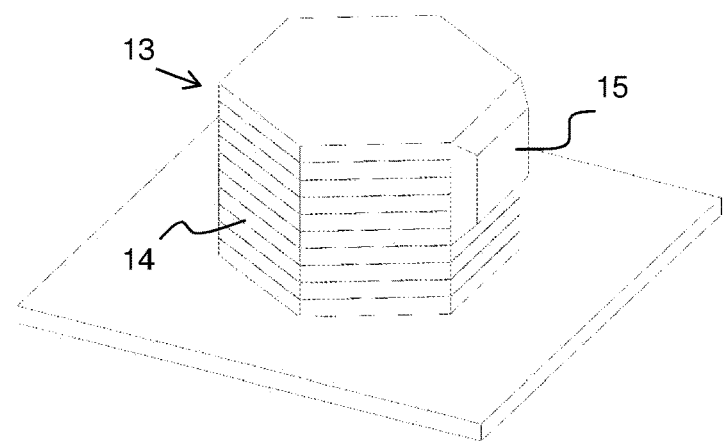
FIG. 5 is a an isometric view of a further 3D object formed by the printer in layers.

FIG. 5 illustrates a completed 3D object 13 with a hexagonal transverse cross section. In this regard the nozzle 2 and/or robotic arm 3/substrate can be appropriately controlled to create items with straight sides 14 and protrusions 15.

Referring again to FIG. 1, the printer incorporates or is connected with a computerised controller 16. This gives directions to progressively adjust the distance and angle between the nozzle 2 and/or the robotic arm 3/substrate to enable the 3D object to be printed. This may include ensuring the nozzle is orthogonal to the surface it is working on. In this regard the controller 16 runs software that interacts with a data file (eg in .STL form) defining the shape of the 3D object. In other words the data provides a set of instructions to the software.

The data defines the shape of the 3D object in terms of a series of slices, each corresponding to one of the layers mentioned previously. When controlling the nozzle 2 and or robotic arm 3/substrate to fill in a taper with transverse deposition strokes, the controller 16 calculates and determines the best nozzle angle of attack and distance to the taper based on the parameters for the next slice or cross-section in the notional stack. The base of the next slice may be used to demarcate a notional boundary for filling in the taper below. The controller 16 also calculates the necessary spray parameters in terms of spray duration, rate of powder feed, spray velocity, temperature of the powder/spray and type of spray material being used.

Movement of the nozzle 2 and/or the robotic arm 3/substrate can be done directly by the controller, for example in a case where the controller and/or nozzle 2 and/or robotic arm 3 incorporate mechanical parts able to move the substrate and/or nozzle in any of three dimensions. However in other embodiments the controller 16 may cause indirect movement of the nozzle and the robotic arm 3/substrate, for example by manipulating a multi-axis positioning device to bring about the same three dimensional movement.

Preferably the infill for each layer is done to achieve a flat top surface parallel to the substrate. However this is not essential and in some cases alternative approaches may be adopted.

In some embodiments of the invention accuracy may be enhanced by including means for measuring the periphery of each layer as it forms, for example with a laser line scanner, a stereoscopic imager or a structured light camera. The measurements are communicated to the controller 16 in real time and used to calculate and bring about adjustments to the operation of the nozzle, substrate or spray parameters.

Figure 6:
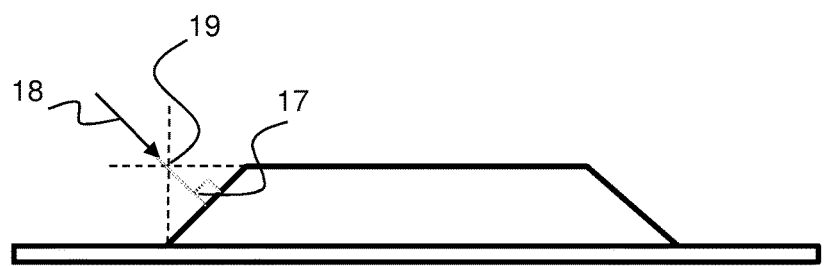
FIG. 6 is a schematic side elevation of a partially formed object illustrating the manner in which tapered edges may be in-filled.

FIG. 6 illustrates a preferred way of in-filling the tapered edges. In this regard the controller 16 causes the nozzle 2 to spray around the circumference of each tapered portion in a 'tool path' to provide the necessary fill. As the robotic arm 3/substrate moves, the controller causes the tapered edge of the part-formed 3D object to be, and substantially remain, perpendicular to the main spray axis of the nozzle 2. The perpendicular nature of the angle is indicated at 17. The movement is such that the notional longitudinal axis 18 of the nozzle passes through the point 19 where a corner of the object will be when the taper is filled.

In preferred forms of the invention sweeps of the robotic arm 3/substrate past the spray nozzle 2 are regulated by the controller 16 to deposit interleaved lines of spray material. In some applications this can improve the deposition ratio.

Figure 7:
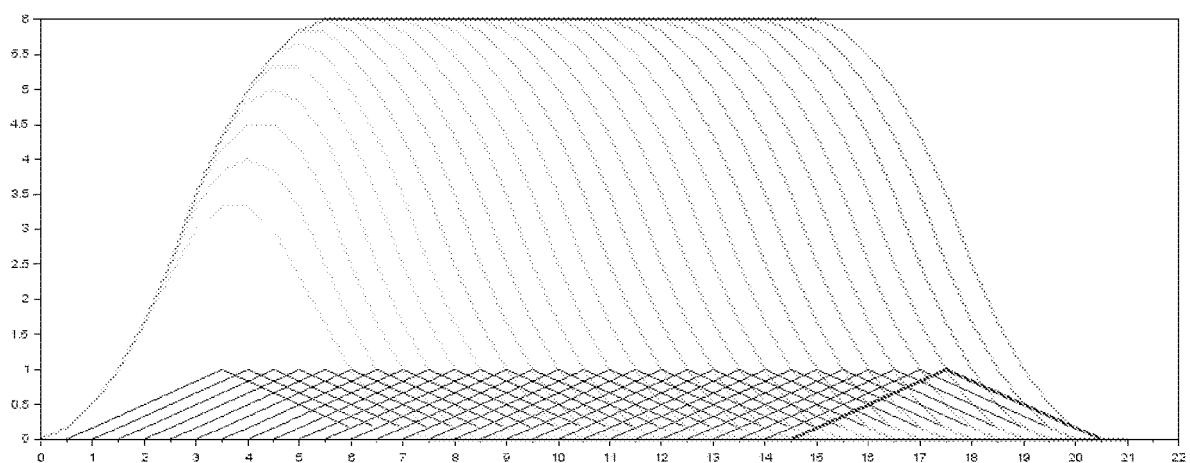
FIG. 7 is a schematic cross-sectional illustration showing the way a cold sprayed layer may be built up by spraying lines adjacent to one another.

FIG. 7 is a cross-sectional schematic representation of how a layer may be optionally built through a series of lines of cold sprayed material wherein each line is sprayed adjacently. The 'x' axis represents a linear distance across the substrate in millimetres, and the 'y' axis represents the linear height spacing between the nozzle and substrate in millimetres. The triangles along the 'x' axis show where the individual lines are placed, and give an indication of the cross-section or spread of material deposited. The taller smooth curves represent the integrated amount of material that actually forms as the lines are sprayed. As the lines are applied adjacently, with a fixed distance between them, the angle at which the spray strikes the surface is oblique, so as to minimise the deposition ratio.

Figure 8:
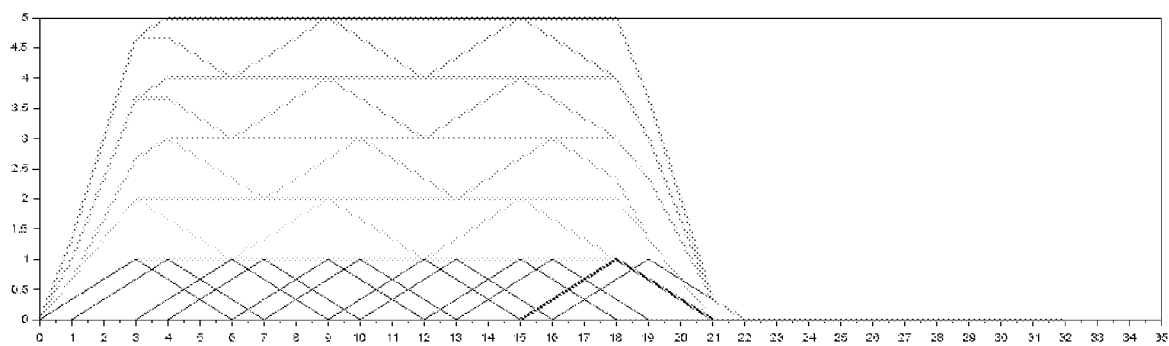
FIG. 8 is a schematic cross sectional illustration showing the way a cold sprayed layer may be built up, by interleaving spray lines for good surface angle of attack, rather than being sprayed adjacently.

FIG. 8 is a cross-sectional representation of how cold sprayed lines of material may be built up when sprayed adjacently. The 'x' axis represents a linear distance across the substrate in millimetres, and the 'y' axis represents the linear height from the substrate in millimetres. The triangles along the 'x' axis show where the individual lines are placed and give an indication of the cross-section of material deposited. The taller curves illustrate the integrated amount of material that forms as the lines are sprayed. As the lines are sprayed in an interleaved fashion, rather than adjacently, the integrated volume builds in a flatter manner.

While some preferred embodiments have been described by way of example it should appreciated that modifications and improvements can occur without departing from the scope of the invention.

The invention claimed is:

1. A method for forming a 3D object via the application of a control means with reference to data which defines 3D shape parameters of an object, comprising:
    controlling an applicator and/or substrate holder through the use of data so that spray material is sprayed at the substrate with the applicator and substrate at a first angular orientation and distance, and then at the object when partially formed, to build the object out of progressively applied parallel layers, wherein at least some of the parallel layers have an initial inwardly tapered outer surface and the material sprayed for each line is offset from and interleaves with material sprayed for one or more neighbouring lines, and the lines of material are sprayed in groups of two lines with a spacing between the two lines, where the spacing between the lines in each group being smaller than the spacing between lines each being part of neighbouring groups of lines; and
    causing, for at least some such parallel layers and prior to formation of subsequent parallel layers, the control means to use the data to cause the applicator to apply spray material to fill in the taper with the applicator and substrate at a second angular orientation and distance, wherein filling in the taper includes calculating parameters of the taper based on spray characteristics of the spray material, calculating an angle between the applicator and taper appropriate for filling the taper, and causing the applicator and taper to be at the angle and the applicator to apply spray material to the taper.

2. A method according to claim 1, wherein the spray is a cold spray comprising metallic powder.

3. A method according to claim 1, wherein:
   (a) the spray is a cold spray comprising metallic powder;
   (b) the data defines the 3D object in terms of a series of the layers; and
   (c) a surface scanner repeatedly measures the object as it is being built, and the control means uses the measurements to adjust the relative positions of the object (when part formed) and the nozzle, and/or spray parameters for the nozzle, to enhance accuracy of match between the shape parameters and the object when completed.

* * * * *